Patented June 12, 1951

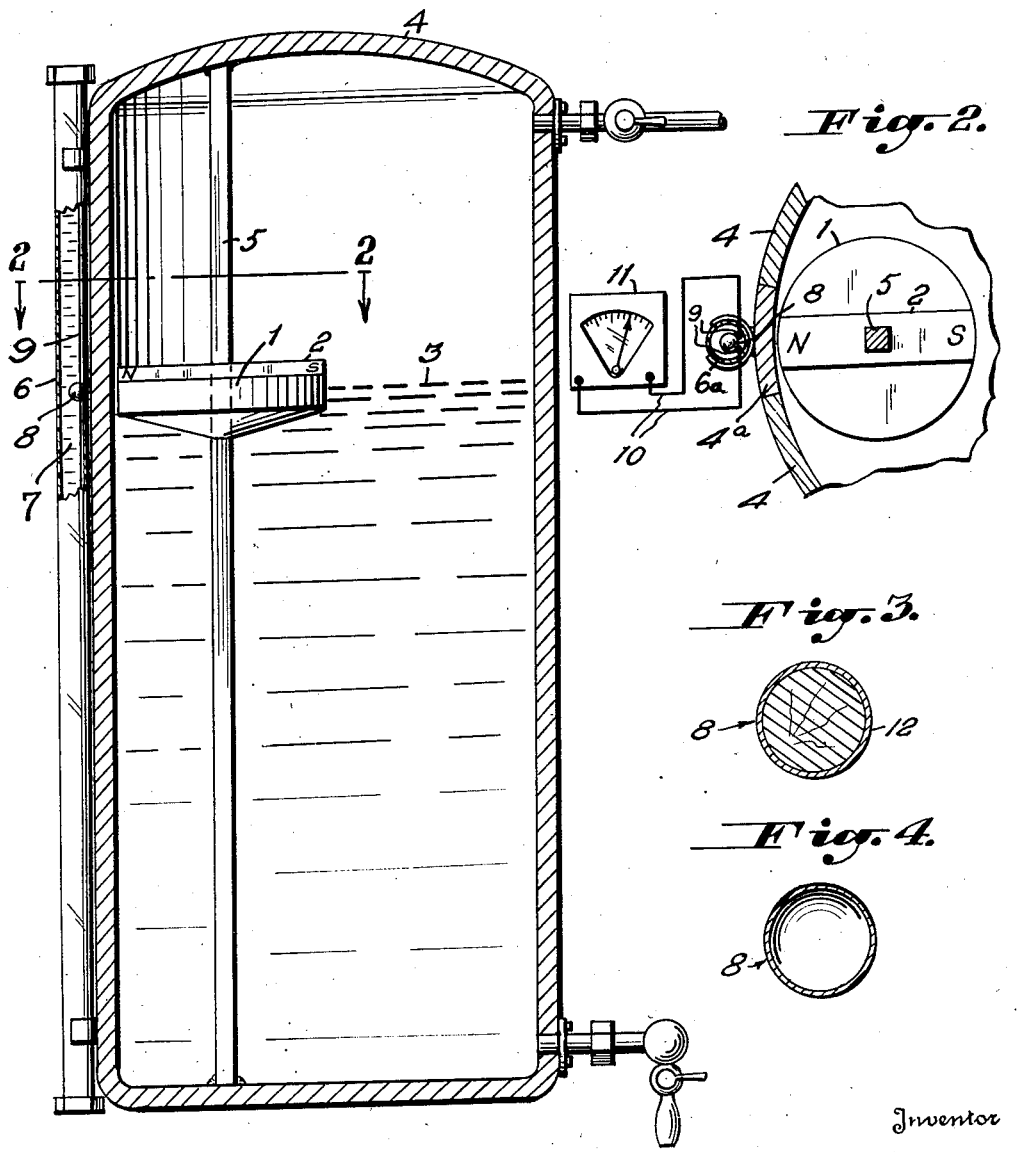

2,556,346

UNITED STATES PATENT OFFICE 2,556,346

LEVEL INDICATOR FOR LIQUID-CONTAINING VESSELS

Bror Wilhelm Strömberg, Stockholm, Sweden

Application September 13, 1948, Serial No. 49,083
In Sweden September 18, 1947

3 Claims. (Cl. 73—305)

This invention relates to a level indicator for liquid-containing vessels, wherein certain disadvantages of several earlier types of indicators have been eliminated.

In simpler level indicators of known types, it is customary to use a transparent indicator tube which connects with the container, thereby producing so called communicating vessels. The tube thereby contains the same fluid as the container. In place of this, another type has a float inside the liquid-container, this float being fastened to a line passing outside of the container by means of pulleys, and counterweighted on the other end. The counterweight itself may be used as an indicator to show the level of the float.

One disadvantage of the first mentioned type is, that the indicator tube, generally made of glass or other brittle material, is exposed to possible breakage, which may risk the loss of the containers contents. There is also the possibility that the connection between the container and the tube may clog with sediment, especially as this connection is usually quite close to the bottom, thereby giving an inaccurate indication of the liquid's level. Furthermore, the indicator tube may easily become clouded if the liquid in the container has adhesive properties, especially if there is a repeated change in its level.

If a float is connected by line and pulleys, it may be pointed out that such an arrangement is often subject to binding, causing an inaccurate reading. The line, requiring an opening in the top of the container for its passage, makes this method impractical where a pressure, greater or less than the atmosphere, is desired within the tank, or if its content is volatile.

By the present invention, the above mentioned difficulties are eliminated. The level indicator according to this invention has the following distinguishing features: A magnet, mounted on a float, guided in a suitable manner to allow free vertical movement, is installed in the fluid-container, and by magnetic attraction, actuates an index element which is contained in a transparent tube outside of the container wall and parallel to the guiding member of the magnet. According to the invention this tube contains a fluid substantially of the same density as the index, thereby eliminating the resistance of gravity to its movement.

To avoid the excessive friction of the index against the wall of the tube, due to the magnetic force, which may cause it to drop away from the magnet's level the index according to the invention is made in the form of a sphere which rolls against the tube wall inside of the tube, vertically and parallel with the magnets path.

The index according to this invention, can suitably be constructed in the form of a sphere of thin sheet iron, hermetically sealed, or of a material with low volume weight, such as cork, wood, or plastic, in a known manner coated with a magnetizable metal for instance soft iron.

In the event that the walls of the container are made of a magnetizable material, such as a cistern of sheet iron; that part of the container wall or jacket which is closest to the index tube, preferably may be cut away, and replaced with a strip of nonmagnetizable material, such as stainless steel, which is welded or brazed in place. This is done to avoid the spreading or hindrance of magnetic lines of force from the magnet to the anchor.

If the index tube is made of a transparent material the level of the index, and hence the level of the fluid in the container may be observed directly. This is the simplest form of level indicator according to the principle of this invention.

In further accordance with the principle of this invention; it is also possible to construct the level indicator in such a manner, that the liquid level in a container may be determined from a remote position. In this arrangement, the tube, which in this case may be made of an opaque material, contains an electrically nonconducting fluid, wherein two parallel wires, insulated from one another are placed to serve as guiding rails for the index, and are connected in a known manner to an electrical measuring bridge, suitably equipped with an indicator dial, which shows the position of the index, and may be calibrated to show the volume of the containers contents.

The fluid in which the index hovers, may under various circumstances be light mineral oil, glycerine, or aqueous solutions of substances which can suitably regulate the specific gravity to conform with the density of the index.

An electromagnet may be used; but to avoid the use of batteries or wires, a permanent magnet is more practical. The float which supports the magnet, can be made of any suitable material. In the case where this is a magnetizable material, a polarity will be developed so that the float itself will actuate the index in the desired manner.

An illustration of the general principle may be found on the accompanying drawing which shows more or less diagramatically, a specific embodiment of my indicator which may of course be varied within the frame work of the invention.

In the showing—

Fig. 1 is a vertical cross section through my device,

Fig. 2 is a partial horizontal cross section, taken along the line 2—2 of Fig. 1, and showing a modification, Fig. 3 is a cross section through one form of index ball on an enlarged scale, while Fig. 4 is a similar view through a modified index ball.

In the various views, like parts are designated by like reference numerals.

In the sealed container 4, which in this instance may be made of sheet aluminium, a float 1, which supports a magnet 2, rests upon the surface of the liquid 3. The float's vertical movement is guided by a rail 5, so arranged that one end of the magnet is close to the container wall. The magnet shown is a permanent bar type, but may have another form, for example horse shoe shaped, or it can be an electromagnet.

Outside the container wall 4, and close to magnet 2, is mounted a liquid filled tube 6, being without any hydraulic connection with container 4. In the fluid 7, the index ball 8 is attracted toward the magnet. According to what has previously been described, the index is without any bond to the magnet, other than magnetic attraction. As shown on the drawing, the index consists of a hollow sheet iron sphere, and the specific gravity of the liquid 7 is so adjusted that it is substantially equal to that of the sphere 8. Thereby the index is freed from gravitation interference, and follows the magnet by means of its attractive forces in a vertical path, rolling against the wall of the tube 6. The tube 6 is made of glass, through which the index and thereby the position of the float can be observed directly. As previously explained however, the tube may be made of a nonmagnetizable and opaque material, for example brass, aluminium, or plastic, if it is constructed with a remote indicator arrangement.

This embodiment of my invention is illustrated in Fig. 2, wherein the tube 6a may be of opaque, non-magnetizable material equipped with two electrically conducting resistance wires 9 which run vertically through the tube adjacent the wall section facing the magnet 2. The index ball 8 rolls along these wires as on a track and, of course, it shorts the wires at the contact points. The resistance wires are connected by wires 10 in an electric circuit which includes an indicator 11 which, in well known manner is calibrated so that it indicates the position of the index ball in the tube 6a and therefore the height of the liquid in the tank 4.

Fig. 2 also shows an embodiment in which the main body of the tank 4 may be constructed of iron or steel while a vertical panel or strip 4a is constructed of non-magnetic material, such as brass, this strip being adjacent the tube 6a as shown.

Two embodiments of index ball are shown in Figs. 3 and 4. In Fig. 3 a solid ball of wood or cork is employed which has an outer coating 12 of magnetic material, whereas in Fig. 4 the index ball constitutes a shell or hollow sphere of magnetic material. Either type of index ball can be employed in all embodiments of this invention. Further modifications of my invention which fall within the scope of the following claims will be immediately evident to those skilled in this art.

I claim:

1. A liquid-level indicator which comprises in combination a container for the liquid whose level is to be indicated, said container having a vertical wall at least a portion of which is of non-magnetic material, a float in said container, means for constraining said float to move in a vertical direction closely adjacent to the non-magnetic portion of said vertical wall, a magnet mounted horizontally on said float in such fashion that at least one of its poles moves with the float along and substantially in contact with said non-magnetic wall portion, a non-magnetic tube filled with a liquid mounted vertically outside said container within the magnetic field of said magnet and adjacent said non-magnetic wall portion and a ball in said tube of magnetic material having a smaller diameter than the inside diameter of said vertical tube and a density substantially equal to that of the liquid in said tube, said magnetic ball when opposite the said pole of said magnet being constrained by the magnetic force of said magnet to roll vertically up and down the tube in accordance with the movements of said magnet and hence of the liquid level in said container and means for indicating the position of said magnetic ball in said non-magnetic tube and hence the level of the liquid in said container.

2. The level-indicator of claim 1 wherein the liquid in said tube is electrically non-conducting and wherein said indicating means comprises a pair of wires mounted vertically in said tube along the tube wall which is adjacent the container wall, said wires being insulated from each other and spaced so that said ball rolls along them thus making an electrical contact between them, and electrical means connected to said wires for measuring at a distance the position of the ball in the tube and therefore the position of the float in said container.

3. The level-indicator of claim 1 wherein said non-magnetic tube is transparent so that the position of the magnetic ball is indicated visually.

BROR WILHELM STRÖMBERG.

REFERENCES CITED

The following references are of record in the file of this patent:

UNITED STATES PATENTS

| Number | Name | Date |
|---|---|---|
| 530,592 | Kleritj | Dec. 11, 1894 |
| 1,040,127 | Bonesteel | Oct. 1, 1912 |
| 1,502,125 | Scott | July 22, 1924 |
| 2,206,006 | Hendry | June 25, 1940 |
| 2,233,572 | Atkins | Mar. 4, 1941 |

FOREIGN PATENTS

| Number | Country | Date |
|---|---|---|
| 20,418 of 1892 | Great Britain | Nov. 11, 1892 |
| 600,546 | France | Feb. 9, 1926 |
| 535,746 | Germany | Oct. 15, 1931 |